US007980945B2

(12) United States Patent
Gatto et al.

(10) Patent No.: US 7,980,945 B2
(45) Date of Patent: Jul. 19, 2011

(54) HIERARCHICAL FIVE-WHEEL GAMING METHODS AND GAMING MACHINES IMPLEMENTING THE SAME

(75) Inventors: Jean-Marie Gatto, London (GB); Sylvie Linard, London (GB); John Papanastasiou, Croydon (GB); Thierry Brunet de Courssou, Henderson, NV (US)

(73) Assignee: IGT, Reno, NV (US)

( * ) Notice: Subject to any disclaimer, the term of this patent is extended or adjusted under 35 U.S.C. 154(b) by 292 days.

(21) Appl. No.: 11/622,671

(22) Filed: Jan. 12, 2007

(65) Prior Publication Data

US 2007/0167238 A1 Jul. 19, 2007

Related U.S. Application Data

(60) Provisional application No. 60/758,803, filed on Jan. 13, 2006.

(51) Int. Cl.
*A63F 13/00* (2006.01)

(52) U.S. Cl. ................ 463/20; 463/16; 463/22; 463/31; 463/42

(58) Field of Classification Search ................ 463/1, 18, 463/40–4, 40–42, 16, 22
See application file for complete search history.

(56) References Cited

U.S. PATENT DOCUMENTS 4,593,904 A 6/1986 Graves
4,695,053 A 9/1987 Vazquez, Jr. et al.
5,342,049 A 8/1994 Wichinsky et al.
5,393,057 A * 2/1995 Marnell, II ...................... 463/13
5,823,873 A 10/1998 Moody
6,012,983 A 1/2000 Walker et al.
(Continued)

FOREIGN PATENT DOCUMENTS

WO WO0141892 A2 6/2001
(Continued)

OTHER PUBLICATIONS

International Search Report mailed Nov. 16, 2007, in related International Application No. PCT/US07/60464, filed Jan. 12, 2007.

(Continued)

*Primary Examiner* — Ronald Laneau
*Assistant Examiner* — Ross A. Williams
(74) *Attorney, Agent, or Firm* — Young Law Firm, P.C.

(57) ABSTRACT

The disclosed embodiments of the present Hierarchical-Five Wheel model of gaming include systems in which every wager made on an electronic game of chance may trigger two games: 1) standard play on the machine's primary display and 2) the display of one or more numbers or symbols on the machine's secondary display. The numbers and/or symbols on each machine's secondary display may combine with the numbers or symbols on other player's secondary displays to create a shared game in which certain predetermined symbol combinations equate to jackpots awarded to participating players. Banks of Hierarchical-Five Wheel machines may have two levels of play, as is described above, or may have three, four, five or more levels of game play. Hierarchical Five-Wheel gaming machines are capable of awarding large, life-changing jackpots to players who are not necessarily winners within their primary game, giving the player multiple ways to win. In addition, Hierarchical Five-Wheel gaming machines use large numbers and graphics to symbolize the random jackpot award, a system that gives the player a visual process to root for and elevates the player's enjoyment and excitement level, thus stimulating wagering.

33 Claims, 15 Drawing Sheets

U.S. PATENT DOCUMENTS

| | | | | |
|---|---|---|---|---|
| 6,019,374 | A | 2/2000 | Breeding | |
| 6,050,895 | A | 4/2000 | Luciano, Jr. et al. | |
| 6,077,163 | A | 6/2000 | Walker et al. | |
| 6,244,957 | B1 | 6/2001 | Walker et al. | |
| 6,267,669 | B1 | 7/2001 | Luciano, Jr. et al. | |
| 6,283,474 | B1 | 9/2001 | de Keller | |
| 6,375,567 | B1 | 4/2002 | Acres | |
| 6,409,597 | B1 | 6/2002 | Mizumoto | |
| 6,517,433 | B2 | 2/2003 | Loose et al. | |
| 6,522,312 | B2 | 2/2003 | Ohshima et al. | |
| 6,761,632 | B2 | 7/2004 | Bansemer et al. | |
| 6,811,482 | B2 | 11/2004 | Letovsky | |
| 6,916,247 | B2 | 7/2005 | Gatto et al. | |
| 6,984,174 | B2 | 1/2006 | Cannon et al. | |
| 7,156,741 | B2 * | 1/2007 | Hornik et al. | 463/40 |
| 7,364,510 | B2 * | 4/2008 | Walker et al. | 463/42 |
| 7,481,430 | B1 * | 1/2009 | Jackson et al. | 273/138.1 |
| 2002/0147040 | A1 | 10/2002 | Walker et al. | |
| 2003/0211881 | A1 | 11/2003 | Walker et al. | |
| 2004/0102238 | A1 | 5/2004 | Taylor | |
| 2006/0205492 | A1 | 9/2006 | Linard et al. | |
| 2007/0167217 | A1 * | 7/2007 | Kaminkow et al. | 463/20 |

FOREIGN PATENT DOCUMENTS

| | | | |
|---|---|---|---|
| WO | WO03035197 | A1 | 5/2003 |

OTHER PUBLICATIONS

Written Opinion mailed Nov. 16, 2007, in related International Application No. PCT/US07/60464, filed Jan. 12, 2007.

International Preliminary Report on Patentability in corresponding PCT application PCT/US07/60464, mailed Sep. 4, 2008.

* cited by examiner

HIERARCHICAL FIVE-WHEEL GAMING METHODS AND GAMING MACHINES IMPLEMENTING THE SAME

This application claims the benefit of priority under 35 U.S.C. §1.19(e), to Provisional Patent Application No. 60/758,803, filed Jan. 13, 2006, which application is hereby incorporated herein by reference in its entirety.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings referred to herein: Copyright 2006, Cyberscan Technology, Inc., All Rights Reserved.

BACKGROUND OF THE INVENTION

1. Field of the Invention

This invention relates generally to the field of regulated pay computer-controlled games, either games of skills or games of chance.

2. Description of the Prior Art and Related Information

The introduction of wide area progressive jackpots into the slot machine arena in the mid 1980's proved to be extremely popular with players who were becoming increasingly bored of one-dimensional games and who appreciated the opportunity to win large, life-changing jackpots. This progressive jackpot concept has since become a staple on most casino floors, spawning a number of successful gaming series like Megabucks® and Monopoly®. These games tend to work along the same principle: when players wager a requisite amount of credits and randomly arrive at a very rare predetermined combination of symbols within the primary game they are playing, they are awarded a large, progressive jackpot. Under these traditional systems, when players do not arrive at a winning combination of symbols within their primary game, they have no opportunity to win a progressive jackpot.

Looking to capitalize on the excitement and popularity of wide area progressive jackpots, game designers created the concept of "Bonusing" or "Mystery Jackpots" to give the player the opportunity to win significant prizes without needing to achieve a win within their primary game. Mystery jackpots have become popular with players who appreciate the opportunity to win large jackpots independently of their primary game, as most players seem to enjoy having more than one way to win. One shortcoming of this model, however, is that the random computation of these awards is completely hidden from the player and thus generates no dramatic visual process to root for, adding no excitement to the gaming process.

SUMMARY OF THE INVENTION

The Hierarchical Five Wheel model of gaming disclosed herein is a revolutionary new system in which every wager made on an electronic game of chance triggers two games: 1) standard play on the machine's primary display and 2) the display of one or more numbers or symbols on the machine's secondary display. The numbers and/or symbols on each machine's secondary display may combine with the numbers or symbols on other player's secondary displays (within the same bank of slot machines or within a "virtual bank") to create a shared game. Certain predetermined combinations of symbols in this shared game equate to jackpots which are awarded to participating players.

In some embodiments of this model, secondary display symbols may beget third display symbols and third-display symbols may beget fourth-display symbols such that large, multi-tiered hierarchies are possible in which players have three, four, or even five or more ways to win. In such embodiments, large, brightly lit displays may hang over banks of gaming machines displaying third, fourth, and fifth level gaming displays such that all players can see them clearly.

The present Hierarchical Five-Wheel model holds all of the advantages of prior methods of progressive jackpot slot machine gaming, without being limited by their shortcomings. Hierarchical Five-Wheel gaming machines (that is, gaming machines that implement an embodiment of the present invention) are capable of awarding large, life-changing jackpots to players who are not necessarily winners within their primary game, giving players multiple ways to win. Also, Hierarchical Five-Wheel gaming machines use large numbers and symbols to dramatize the process of the random jackpot award, a system that gives the player a visual process to root for, elevates the player's enjoyment and excitement level, and causes the player to play longer. Furthermore, since players playing within the same bank of machines share wins on their secondary display game, this model fosters a sense of camaraderie that has proven to stimulate wagering in gaming models such as craps but that has never before been leveraged within electronic games of chance.

Embodiments of the present Hierarchical Five-Wheel model of gaming are not limited to slot machine play. Indeed, embodiments of the present invention may be applied to card games, puzzle games, or any electronic game of chance.

Accordingly, an embodiment of the present invention is a method of awarding a jackpot in a networked gaming system that includes a plurality of gaming machines. Such a method may include steps of funding the jackpot; establishing a network of five gaming machines of the plurality of gaming machines, each of the five gaming machines having a first video display and a second video display; providing a separate five-reel primary game of chance on each of the five gaming machines, each separate five-reel primary game of chance being displayed on the first video display of one of the five gaming machines; providing a five-reel secondary game of chance, each one of the five reels of the secondary game having symbols displayed on the second video display of a selected one of the five gaming machines, and rewarding at least one participating player of the five gaming machines all or part of the jackpot when predetermined, reward-generating symbol combinations occur on a secondary payline collectively formed across the reels displayed on the five second video displays subsequent to an outcome of the secondary game of chance.

According to further embodiments, the method may further include a step of providing a central server and the secondary game of chance may be controlled by the central server. The secondary game of chance may be controlled by at least some of the five gaming machines in a peer-to-peer fashion. The first video display and the second video display of each of the five gaming machines may be merged into a single display. In one or more of the five gaming machines, the second video display may be a portion of the first video display. Each symbol of the secondary payline may be a predetermined symbol of a primary payline of the primary game of one of the five gaming machines. The method may further include a step of increasing the jackpot by collecting a selected amount from wagers used to fund the primary game played by players of the five gaming machines and by adding the collected selected amount to the jackpot. The method may further include a step of revealing symbols of the secondary payline displayed across the second video displays of the five gaming machines at a predetermined posted interval and only participating players who have placed a wager before an expiration of a current interval may share in the rewarded jackpot. The method may further include a step of keeping participating players who do not place a wager before the expiration of the current interval from sharing in any jackpot to be awarded at a next interval. The establishing step may be carried out such that the five gaming machines in the network are freely selectable from among the plurality of gaming machines from one interval to the next interval. Each constituent symbol of the secondary payline may be revealed concurrently with each wager placed on the primary game. Constituent symbols of the secondary payline may be revealed on each of the five gaming machines only when a primary game wager has been placed on each of the five gaming machines. Each reel of the five-reel secondary game of chance may spin to heighten player suspense between placing a wager on the primary game and when the reels of the five-reel secondary game of chance stop to form the stopped secondary payline that spans across each of the second video displays of the five gaming machines. The method may further include the steps of: maintaining a second jackpot; establishing a network of five groups of five gaming machines, each established group of five gaming machines generating a respective secondary payline; providing a network connected third video display; providing a five-reel tertiary game of chance that is configured to generate a tertiary payline that is collectively formed by one symbol from the secondary payline of each group of five gaming machines; displaying the tertiary payline on the third video display, and awarding at least one participating player of all or part of the second jackpot when predetermined, reward-generating symbol combinations occur on the tertiary payline displayed on the third video display subsequent to an outcome of the tertiary game of chance.

The method may further include a step of updating the tertiary payline subsequent to an outcome of the secondary game on each of the five groups of five gaming machines. The method may further include a step of providing a central server coupled to the network and the tertiary game of chance may be controlled by the central server. The tertiary game of chance may be controlled by participating ones of the five groups of five gaming machines in a peer-to-peer fashion. The method may further include a step of displaying the collective symbols of the secondary payline displayed across the second video displays of the five gaming machines in a portion of one of the first video display and the second video display in each of the five gaming machines. The method may further include a step of displaying at least the tertiary payline displayed on the third video display in a portion of one of the first video display and the second video display in each of the five gaming machines. Each of the five gaming machines may be configured to utilize pop-up window technology for the secondary gaming displays such that the secondary gaming displays may be usable for multiple purposes. For example, the multiple purposes may include replicating (displaying) collective symbols of the secondary payline displayed across the second video displays of the five gaming machines, and/or replicating (displaying) at least the tertiary payline displayed on the third video display.

According to another embodiment thereof, the present invention is a method of awarding a jackpot to participating players in a networked gaming system that includes a plurality of gaming machines. The method may include steps of funding a jackpot; establishing a network of a plurality of participating ones of the plurality of gaming machines, each having a first video display and a second video display; providing a separate primary game of chance on each of the participating gaming machines played by respective participating players, each separate primary game of chance being displayed on the first video display of one of the participating gaming machines; providing a multi-reel secondary game of chance, each one of the multi-reel of the secondary game having symbols displayed on the second video display of a selected one of the participating gaming machines, and rewarding at least one participating player of the participating gaming machines of all or part of the jackpot when predetermined, reward-generating symbol combinations occur on a secondary payline collectively formed across the reels displayed on the second video displays of the participating gaming machines subsequent to an outcome of the secondary game.

According to further embodiments, the method may further include a step of providing a central server coupled to the network and the secondary game of chance may be controlled by the central server. The secondary game of chance may be controlled by one or more of the plurality of participating gaming machines in a peer-to-peer fashion. The first video display and the second video display of each of the plurality of participating gaming machines may be merged into a single display. In one or more of the plurality of participating gaming machines, the second video display may be a portion of the first video display. Each symbol of the secondary payline may be a symbol of a primary payline of the primary game of one of the plurality of participating gaming machines. The method may further include a step of increasing the jackpot by collecting a selected amount from wagers used to fund the primary game played by players of the plurality of participating gaming machines and by adding the collected selected amount to the jackpot. The method may further include a step of revealing symbols of the secondary payline displayed across the second video displays of the plurality of participating gaming machines at a predetermined posted interval and only participating players who have placed a wager before an expiration of a current interval may share in the rewarded jackpot. The method may further include a step of keeping participating players who do not place a wager before the expiration of the current interval from sharing in any jackpot to be awarded at a next interval.

The establishing step may be carried out such that the plurality of participating gaming machines in the network may be freely selectable from among the plurality of gaming machines from one interval to the next interval. Each constituent symbol of the secondary payline may be revealed concurrently with each wager placed on the primary game. Constituent symbols of the secondary payline may be revealed on each of the plurality of participating gaming machines only when a primary game wager has been placed on each of the plurality of participating gaming machines. Each reel of the multi-reel secondary game of chance may spin to heighten player suspense between placing a wager on the primary game and when the reels of the multi-reel secondary game of chance stop to form a stopped secondary payline that spans across each of the second video displays of the plurality of participating gaming machines.

The method may further include the steps of: maintaining a second jackpot; establishing a network of N groups of M participating gaming machines, each of the N groups of M participating gaming machines generating a respective secondary payline; providing a network connected third video display; providing a multi-reel tertiary game of chance that may be configured to generate a tertiary payline that may be collectively formed by one symbol from the secondary payline of each of the N groups of M gaming machines; displaying the tertiary payline on the third video display, and awarding at least one participating player of all or part of the second jackpot when predetermined, reward-generating symbol combinations occur on the tertiary payline displayed on the third video display subsequent to an outcome of the tertiary game of chance. The method may further include a step of updating the tertiary payline subsequent to an outcome of the secondary game on each of the N groups of M participating gaming machines.

The method may further include a step of providing a central server coupled to the network and the tertiary game of chance may be controlled by the central server. The tertiary game of chance may be controlled by participating ones of the N groups of M gaming machines in a peer-to-peer fashion. The method may further include a step of displaying the collective symbols of the secondary payline displayed across the second video displays of the five gaming machines in a portion of one of the first video display and the second video display in each of the five gaming machines. The method may further include a step of displaying at least the tertiary payline displayed on the third video display in a portion of one of the first video display and the second video display in each of the five gaming machines. Each of the five gaming machines may be configured to utilize pop-up window technology for the secondary gaming displays such that the secondary gaming displays may be usable for multiple purposes. For example, such multiple purposes may include replicating (e.g., displaying) collective symbols of the secondary payline displayed across the second video displays of the five gaming machines, and/or replicating (e.g., displaying) at least the tertiary payline displayed on the third video display.

Still another embodiment of the present invention is a method of awarding a jackpot in an electronic game of chance that includes steps of establishing a network of at least two participating gaming machines, each participating gaming machine having at least a primary display area and a secondary display area; providing a primary game of chance on the primary display area of each participating gaming machine, the outcome of the primary game being random; collecting a wager from one or more players on all participating gaming machines, the wager being used to fund the primary game and at least one secondary game; displaying symbols on the secondary display area of each participating gaming machine in the network responsive to said wager; rewarding at least a portion of the jackpot to at least one participating player when predetermined, reward-generating symbol combinations occur on a secondary payline that spans across the secondary display areas of participating gaming machines.

The method may further include a step of revealing first display area symbols at a predetermined posted interval and only those players who have placed a wager before an expiration of the interval may be eligible to share in the jackpot. A step may be carried out of keeping participating players who do not place a wager before expiration of a current interval from sharing in any jackpot to be awarded at a next interval. Both a number of the participating gaming machines and which of the symbols displayed on each of the secondary display area collectively make up the secondary payline may be determined by a central server coupled to the network. The method may further include a step of displaying symbols on the secondary display area concurrently with each wager placed on the primary game. The method may further include a step of revealing constituent symbols of the secondary payline on each of the participating gaming machines only when a primary game wager has been placed on each of the participating gaming machines. The method may further include a step of spinning the symbols on the secondary display area to heighten player suspense. The method may further include a step of enabling a participating player to activate more than one symbol on the secondary display area of his or her participating gaming machine by placing multiple primary game wagers before the secondary payline is stopped and an outcome of a current on-going secondary game is fixed.

Yet another embodiment of the present invention is a hierarchical jackpot awarding system for a networked connected gaming system that may include a plurality of gaming machines. Such a system may include a network of a plurality of participating ones of the plurality of gaming machines, each having a first display area and a second display area and each being configured to be played by a participating player; a separate primary game of chance for each participating gaming machine, each separate primary game of chance being configured to display symbols in the first display area; a secondary game of chance associated with the participating gaming machines, the secondary game being configured to display symbols across the second display area of each of the participating gaming machines, and a first jackpot. Each participating gaming machine may be further configured to award one or more participating player all or part of the first jackpot when predetermined, reward-generating symbol combinations occur on a secondary payline collectively formed across the second display areas of the participating gaming machines subsequent to an outcome of the secondary game of chance.

The system may further include a third display area, the third display area being connected through the network with the participating gaming machines; a tertiary game of chance associated with selected ones of the plurality of participating gaming machines, the tertiary game being configured to display symbols on the third display area, and a second jackpot. The selected participating gaming machines may be further configured to award one or more participating player all or part of the second jackpot when predetermined, reward-generating symbol combinations occur on the third display area subsequent to an outcome of the tertiary game of chance. The symbols displayed on the second display areas of participating gaming machine may include selected ones of the symbols displayed on the first display areas of the participating gaming machines. The symbols displayed on the third display area of the selected participating gaming machines may include selected ones of the symbols displayed on the second display areas of the participating gaming machines. The system may also include a central server coupled to the network, and the central server may be further configured to control the secondary game of chance. The secondary game of chance may be controlled, for example, by the participating gaming machines in a peer-to-peer fashion. For at least one of the participating gaming machines, the first display area and the second display area may be merged into a single display area. The second display area may be a portion of (e.g., a window or other segregated portion of) the first display area. The system may further include a central server coupled to the network and the tertiary game of chance may be controlled by the central server. The tertiary game of chance may be controlled by the selected participating gaming machines in a peer-to-peer fashion. Each symbol of the secondary payline may be a predetermined symbol of a primary payline of the primary game of a participating gaming machine.

According to still another embodiment, the present invention is a network connected gaming system that may include a plurality of gaming machines. Such a gaming system may include a network of participating ones of the plurality of gaming machines, each participating gaming machine including a primary gaming display and a secondary gaming display; a separate primary game of chance for each participating gaming machine, each separate primary game being configured to be displayed on the primary gaming display of one of the participating gaming machines, each participating gaming machine being configured to display symbols on its respective secondary gaming display, and each participating gaming machine being further configured to manage, determine, and display the symbols on its secondary gaming display such that predetermined symbol combinations occurring on a secondary payline spanning across a predetermined number of participating machines cause at least one player wagering on one of the participating gaming machines to be awarded a bonus award.

The symbols displayed on the secondary gaming displays of the participating gaming machines may be selected from fruit symbols, poker symbols, and pre-licensed icons from popular culture, to name but a few of the limitless possibilities. The gaming system may further include a wager management system coupled to the network. The wager management system may be configured to divert a predetermined portion of each wager placed and to add the diverted predetermined portion of each wager to a jackpot pool that may be available to be awarded to players of the participating gaming machines based on the occurrence of predetermined symbol combinations on the secondary gaming displays. Symbols appearing on the secondary gaming displays of the participating gaming machines may be randomly generated. Symbols appearing on the secondary gaming display of each participating machine may include symbols that appear at a predetermined point in the primary game on the primary gaming display displayed on the secondary gaming display of each of the participating gaming machines may be selectable from a pool of symbols that occur within the primary game displayed on the primary gaming display.

The participating gaming machines may be disposed adjacent to one another such that the symbol combinations of the secondary payline across the secondary gaming displays of the participating gaming machines are clearly visible. The participating gaming machines may be spread out over a plurality of locations. The secondary payline in its entirety may be fully shown on each of the secondary gaming displays of each of the participating gaming machines. The participating gaming machines may be further configured to display symbols on their respective secondary gaming displays at a predetermined posted interval and only players who have placed a wager before an expiration of a current interval may share in the bonus award. The participating gaming machines may be further configured such that players who do not place a wager before the expiration of the current interval are enabled to place a wager during the next interval. Both a number of the participating gaming machines and which of the symbols displayed on each of the secondary gaming displays collectively make up the secondary payline may be determined by a central server coupled to the network. The participating gaming machines may be configured to display symbols on the secondary display area concurrently with each wager placed on the primary game. Constituent symbols of the secondary payline may be revealed on each of the participating gaming machines only when a primary game wager has been placed on each of the participating gaming machines. The participating gaming machines may be further configured to spin the symbols on the secondary gaming displays to heighten player suspense. The participating gaming machines may be configured to enable players to activate more than one symbol on the secondary gaming display of his or her participating gaming machine by placing multiple primary game wagers before the secondary payline is stopped and an outcome of a current on-going secondary game is fixed. The participating gaming machines may be configured to utilize pop-up window technology for the secondary gaming displays such that the secondary gaming displays may be usable for multiple purposes. The wager management system may be further configured such that all players whose participating gaming machines displays part of a winning secondary payline are awarded an equal percentage of the bonus award. Alternatively or in addition, the wager management system may be further configured such that a selected one of the players whose participating gaming machines displays part of a winning secondary payline is awarded all of the bonus award.

Further, the wager management system may be configured to award different portions of the bonus award to players whose participating gaming machines display part of a winning secondary payline according to predetermined criteria. For example, the predetermined criteria may include placing a greatest number of wagers within a predetermined time interval or placing a largest sum of wagers in the predetermined time interval, to identify but two illustrative examples of such criteria.

BRIEF DESCRIPTION OF THE DRAWINGS

FIG. 3 also demonstrates that jackpots may be funded by a small percentage of each wager made on participating machines, according to further embodiments of the present invention.

DETAILED DESCRIPTION

Reference will now be made in detail to the construction and operation of preferred implementations of the present invention illustrated in the accompanying drawings. The following description of the preferred implementations of the present invention is only exemplary of the invention. The present invention is not limited to these implementations, but may be realized by other implementations.

Figure 1:
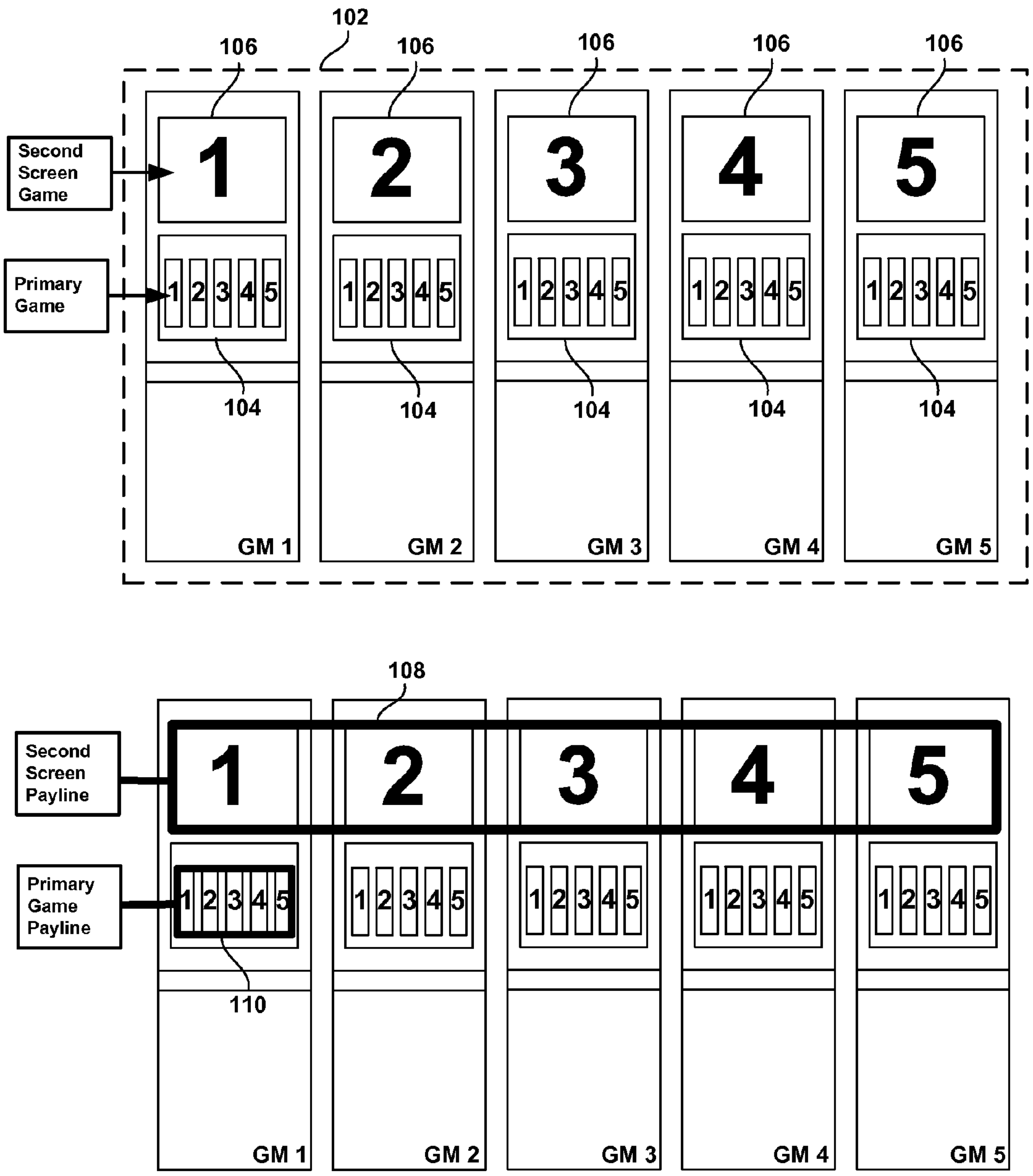
FIG. 1 illustrates a basic five gaming machine bank of Hierarchical Five-Wheel slot machines, according to an embodiment of the present invention.

FIG. 1 illustrates a first embodiment of the described invention. In this figure, a bank 102 of five slot gaming machines GM1, GM2, GM3, GM4 and GM5 is shown, each of the five slot gaming machines including a first or primary display 104 and a second or secondary display 106. The slot machine implementation of the illustrated embodiments of the present inventions are used for illustrative purposes only, and are not intended to limit the scope of the inventions disclosed herein. As shown, according to embodiments of the present invention, the first display 104 may display a primary game, such as a five reel fruit slot machine, although other implementations are possible (e.g., video poker, craps, other games of chance). Each of the primary displays 104 may be configured to display one or more primary game paylines, as shown in FIG. 1 at 110. Each gaming machine's secondary displays 106, according to an embodiment of the present invention, may be configured to display a secondary game. According to an embodiment of the present invention, the secondary displays 106 may display a number and/or symbol (or more than one number and/or more than one symbol) that acts as a constituent element within a shared secondary payline 108 collectively formed by the secondary displays of the bank 102 of gaming machines. When the symbols on each player's secondary display 106 combine to create a winning payline, participating players may share in that jackpot. That is, when the secondary payline 108 formed by the constituent secondary displays 106 of the gaming machines within the bank 102 collectively display a winning payline (e.g., as would be the case, for example, when each of the secondary displays 106 displays a matching fruit), all of the players of the gaming machines GM1, GM2, GM3, GM4 and GM5 of the bank 102 may be rewarded and share in the payout for that winning payline. In this manner, the Hierarchical Five-Wheel Model shown in FIG. 1 makes use of a bank of electronic games of chance whose secondary displays contain numbers or symbols that collectively act as elements within an additional, shared game. The methods and systems disclosed herein may be advantageously used instead of or in combination with the methods and systems disclosed in the co-pending and commonly assigned U.S. patent application Ser. No. 11/354,568, filed Feb. 14, 2006, which is hereby incorporated herein by reference in its entirety. The secondary payline 108 may be configured to be active only when all five gaming machines GM1, GM2, GM3, GM4 and GM5 are engaged in active game play with a player. Alternatively, the secondary payline may be configured to be active even when one or more of the gaming machines of the bank 102 are not currently engaged in active game play with a player, to the extent desirable and/or as allowed by applicable gaming regulations.

Figure 2:
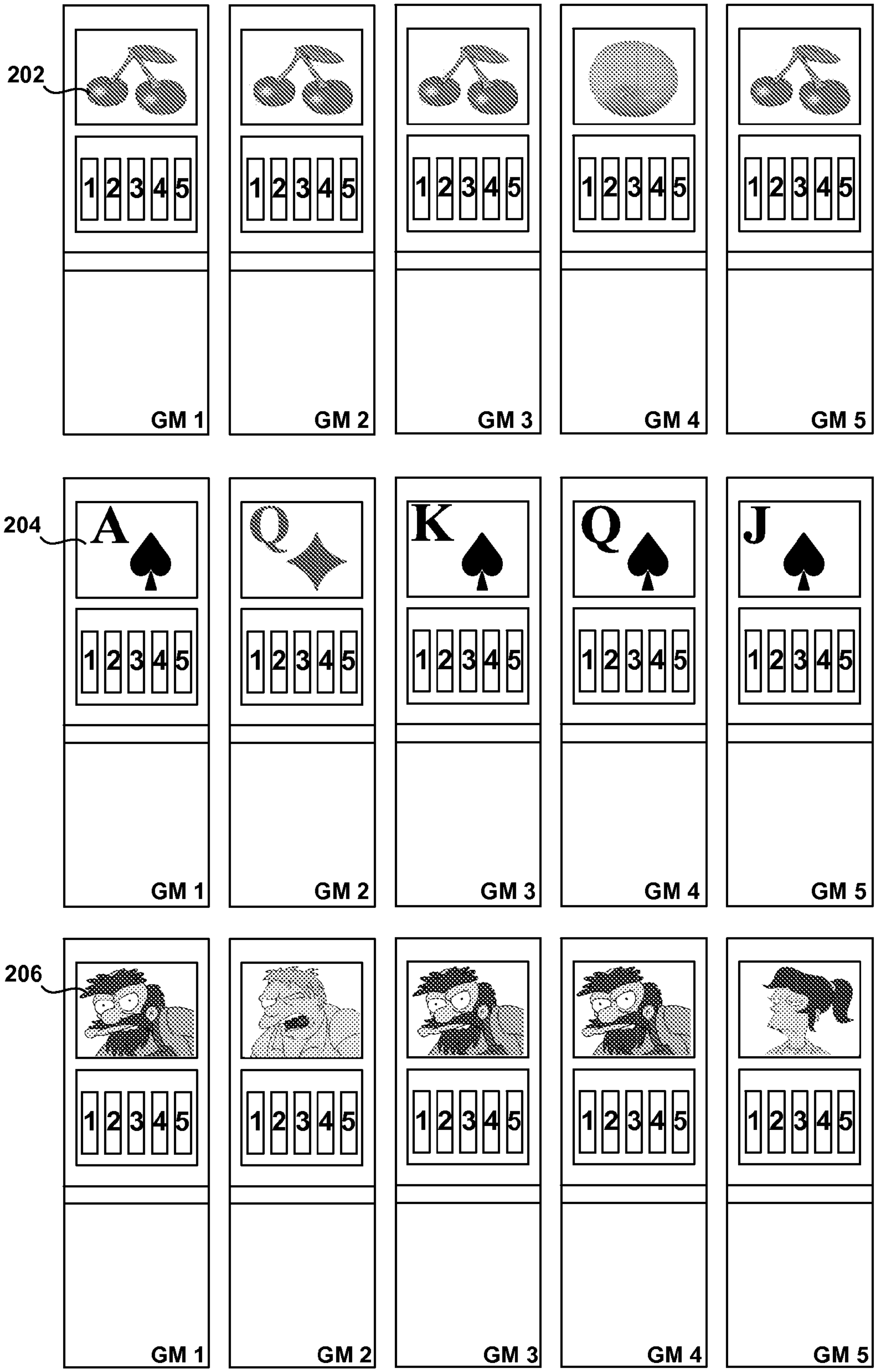
FIG. 2 depicts some possible symbols that may be used to form secondary display paylines within the Hierarchical Five-Wheel model, according to further embodiments of the present invention.

FIG. 2 illustrates some possible symbols that may be displayed within the secondary display of each gaming machine, according to various embodiments of the present Hierarchical Five-Wheel gaming model. Some of these possibilities include but are not limited to: numbers as shown in FIG. 1, fruit symbols 202, poker symbols 204 colorful graphics, or pop culture characters 206, subject to proper rights clearances and licensing from any copyright owner.

Figure 3:
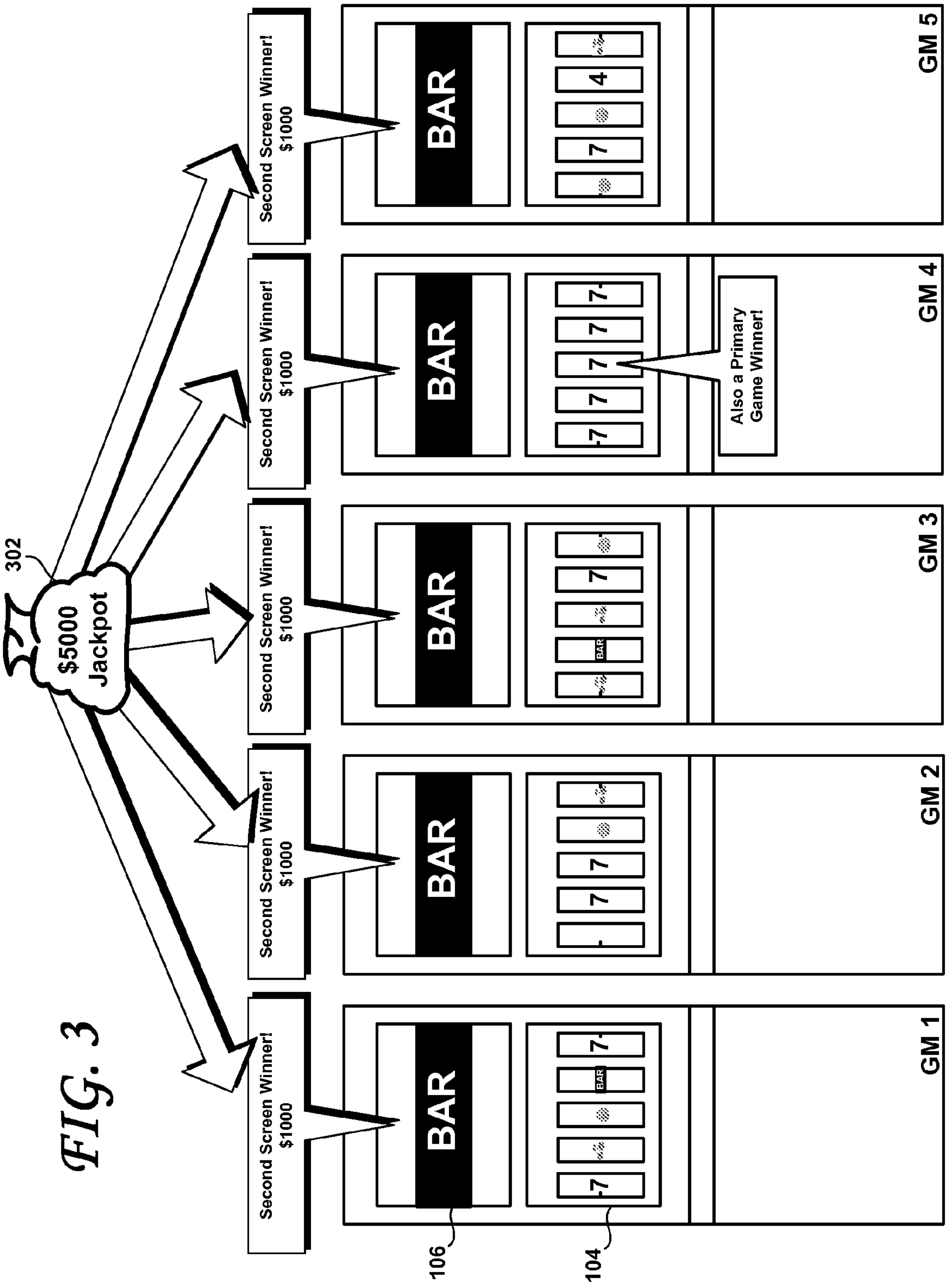
FIG. 3 demonstrates how primary and secondary game play may be independent in the Hierarchical Five-Wheel model, according to an embodiment of the present invention.

FIG. 3 illustrates that the generation of symbols on the secondary display 106 may be independent of the game displayed on each gaming machine's primary display 104 such that players may win a progressive jackpot even when they have not won within their primary game. Note that in the illustrative case of FIG. 3, only the player of GM4 is a primary game winner, but all players of the GM1, GM2, GM3, GM4 and GM5 may share in the $5,000 Jackpot won from the secondary payline. Moreover, it is to be noted that this independence may express itself in other ways, in that the symbols appearing on the secondary display need not be of the same kind as the symbols that determine a winning payline in the primary display. In FIG. 3, for example, although the primary game in the primary displays 104 is a fruit slot machine, the secondary display need not display any of the symbols of fruit slot machines and may, instead, display poker symbols, spell out a winning phrase or show popular culture characters, for example. That is, just because the primary display 104 may display fruit symbols, the secondary display need not also display such fruit symbols but may alternatively display most any other collections of symbols.

The jackpot 302 awarded through achieving a winning secondary payline on the secondary displays 108 may be funded by a small percentage of each wager made on a participating machine GM1, GM2, GM3, GM4 and GM5 and/or may be funded from other sources. According to an embodiment of the present invention, the jackpot 302 may be divided across those gaming machines whose secondary displays 106 display symbols that collectively form a winning secondary payline. The jackpot 302 may be divided evenly across all gaming machines within a bank of gaming machines or the distribution of the jackpot to the players of the participating gaming machines may be weighted according to some formula, if desired and allowed by applicable gaming regulations. Jackpot processing may occur at a central server or may occur within a network of serverless cashless gaming machines (as disclosed in commonly assigned U.S. Pat. No. 6,916,244, the disclosure of which is hereby incorporated herein in its entirety). In the embodiment of the invention of FIG. 3, the jackpot 302 is shared by all participating players. In other embodiments of the invention, players meeting certain incentives (i.e. the last player to bet or the first player to bet, or the player with the most bets in a predetermined period of time) may win a larger percentage of the jackpot or the entire jackpot. In addition, players may have to wager a predetermined ante in order to participate in secondary display drawings or may have to qualify for the drawing by meeting a set of predetermined criteria. Jackpot distribution may be weighed so that players who have contributed more win a larger percentage of the jackpot 302 than players who have contributed comparatively less.

Figure 4:
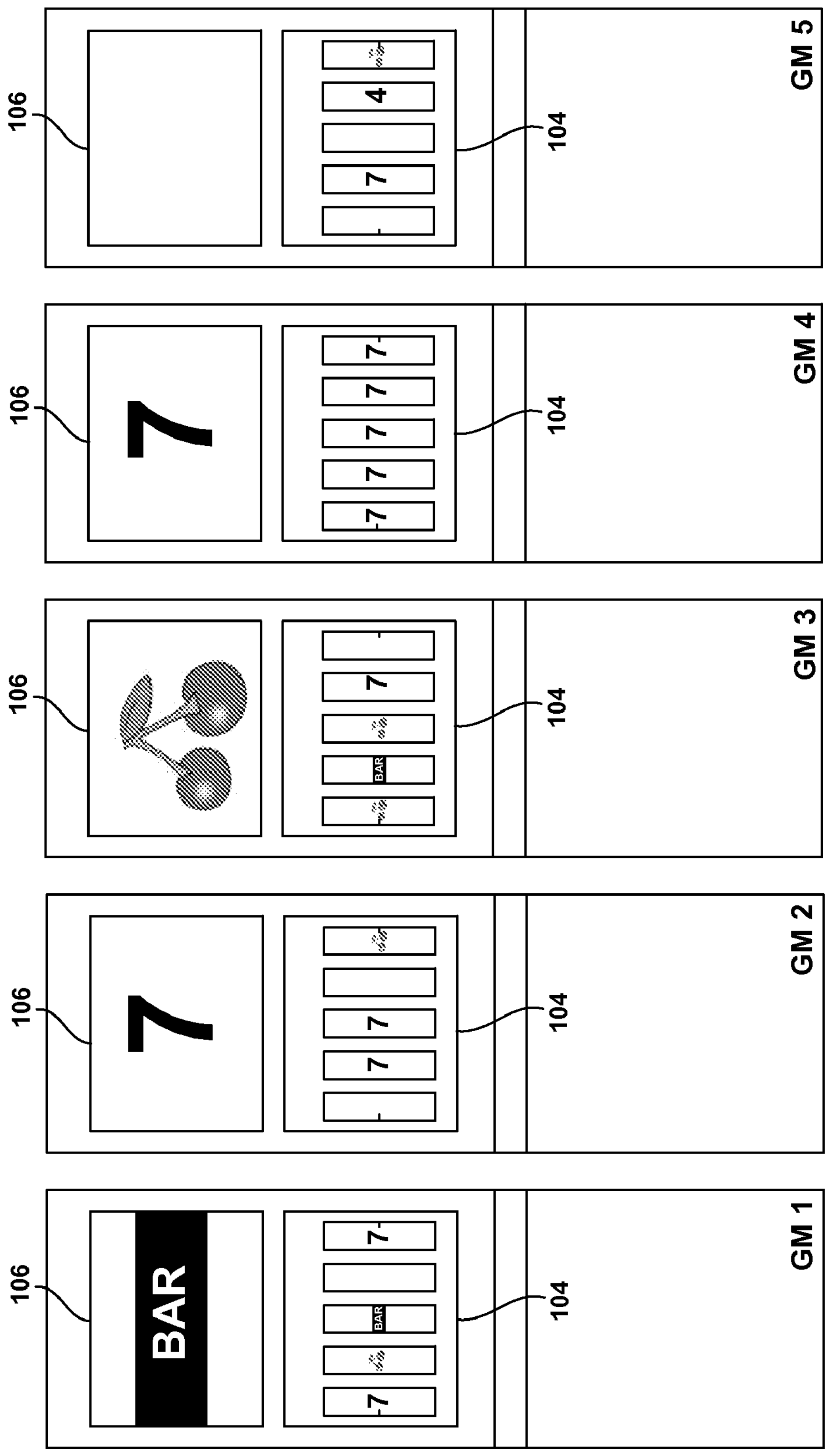
FIG. 4 demonstrates that, in one embodiment of the Hierarchical Five-Wheel model, the secondary display may be populated by symbols from the primary game play.

FIG. 4 illustrates another embodiment of the present invention in which the symbols from the primary game in the primary display 104 may be used to populate the secondary payline shown in the secondary display 106. It should be noted that it still remains possible for the player to lose the primary game play in the primary display 104 and still win a progressive jackpot formed by a winning secondary payline. In the exemplary embodiment illustrated in FIG. 4, the symbol used for each game's secondary display 106 may come from a fixed location within the primary game in the primary display 104, in this example, the center reel. That is, in the case of a slot machine implementation, the secondary display 106 may be configured to display the symbol of a predetermined reel of its primary display such as, for example, the middle reel.

Figure 5:
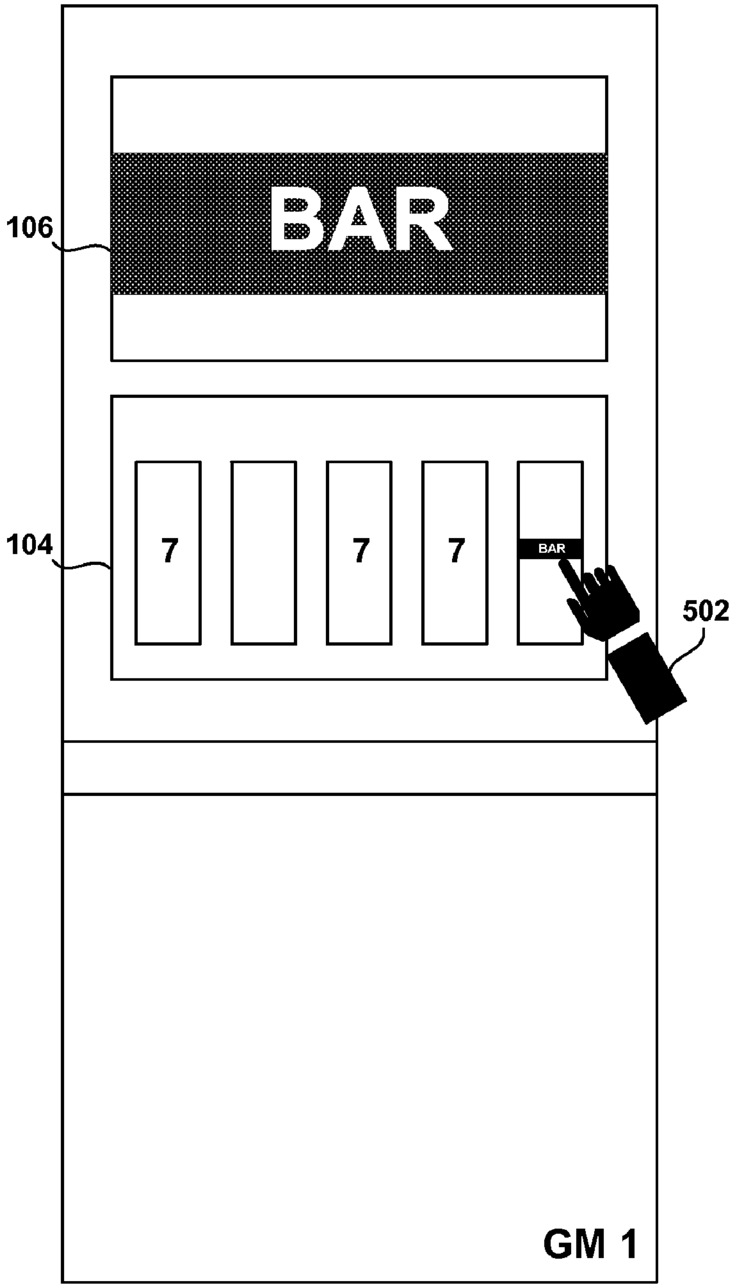
FIG. 5 depicts an embodiment of the Hierarchical Five-Wheel model where the player may select which symbol from his or her primary game populates the game's secondary display.

FIG. 5 illustrates another embodiment of the present invention in which players are given the ability to choose, as suggested at 502, which symbol from their primary game in the primary display 104 will populate their secondary display 106. Alternatively, players may be given the ability to select which reel appearing in the primary display 104 will populate the secondary display 106. Using this model, it remains possible for the player to lose in primary game play on the primary display 104 and still win a progressive jackpot.

Figure 6:
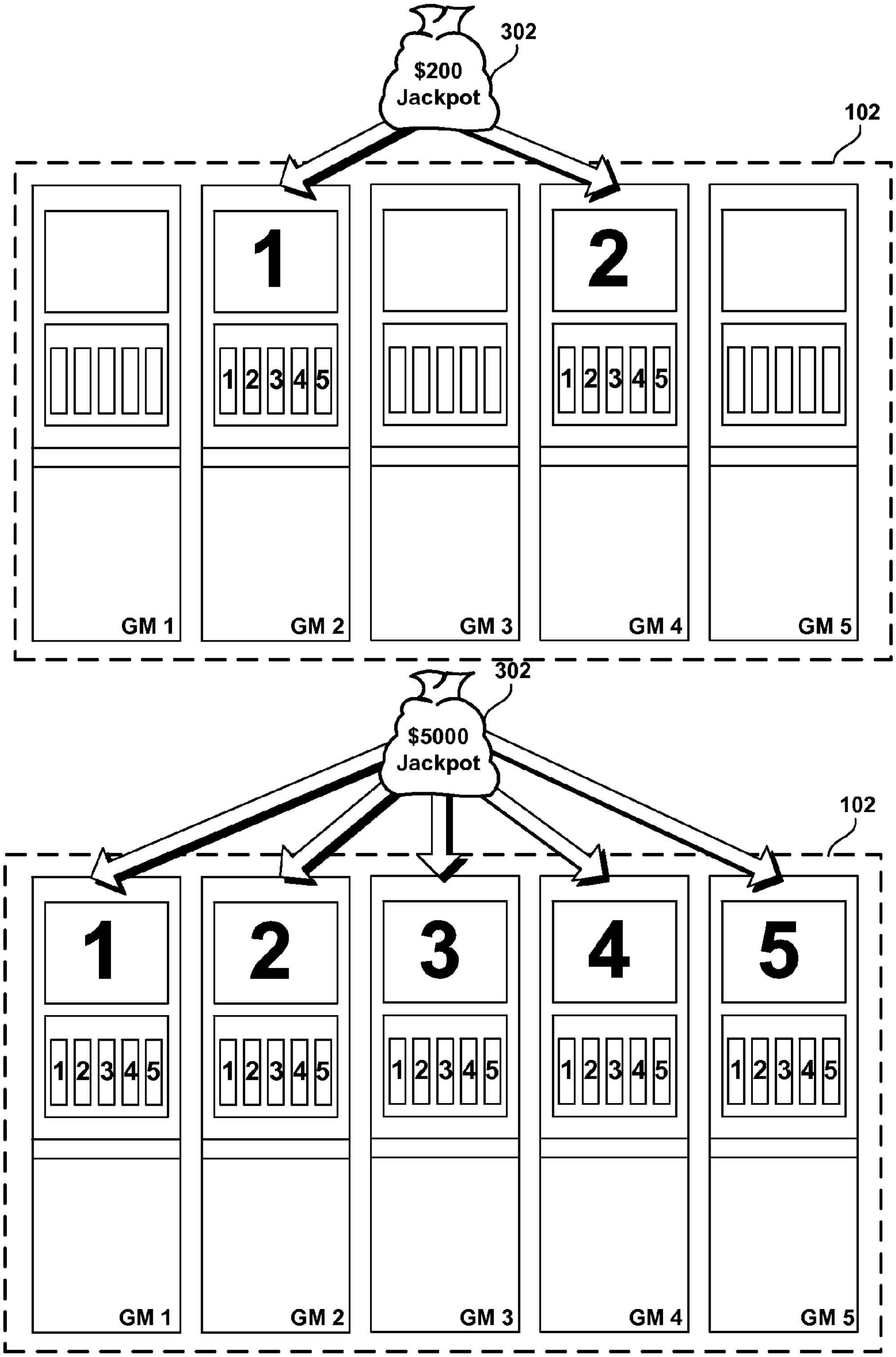
FIG. 6 illustrates how the Hierarchical Five-Wheel model may accommodate player groupings of different sizes, according to an embodiment of the present invention.

FIG. 6 illustrates that the present Hierarchical Five-Wheel model according to embodiments of the present invention may accommodate virtually any number of players, with smaller jackpots 302 being generated within banks containing fewer players and larger jackpots 302 being generated within banks containing a greater number players. In this embodiment, the jackpot 302 may be divided by the number of players within the bank 102 of gaming machines. In the illustrated case, the jackpot 302 is divided in two when there are two players actively playing as shown in the top drawing of FIG. 6 and is divided into five shares when each gaming machine within the bank 102 is being played, as shown in the bottom drawing of FIG. 6.

Figure 7:
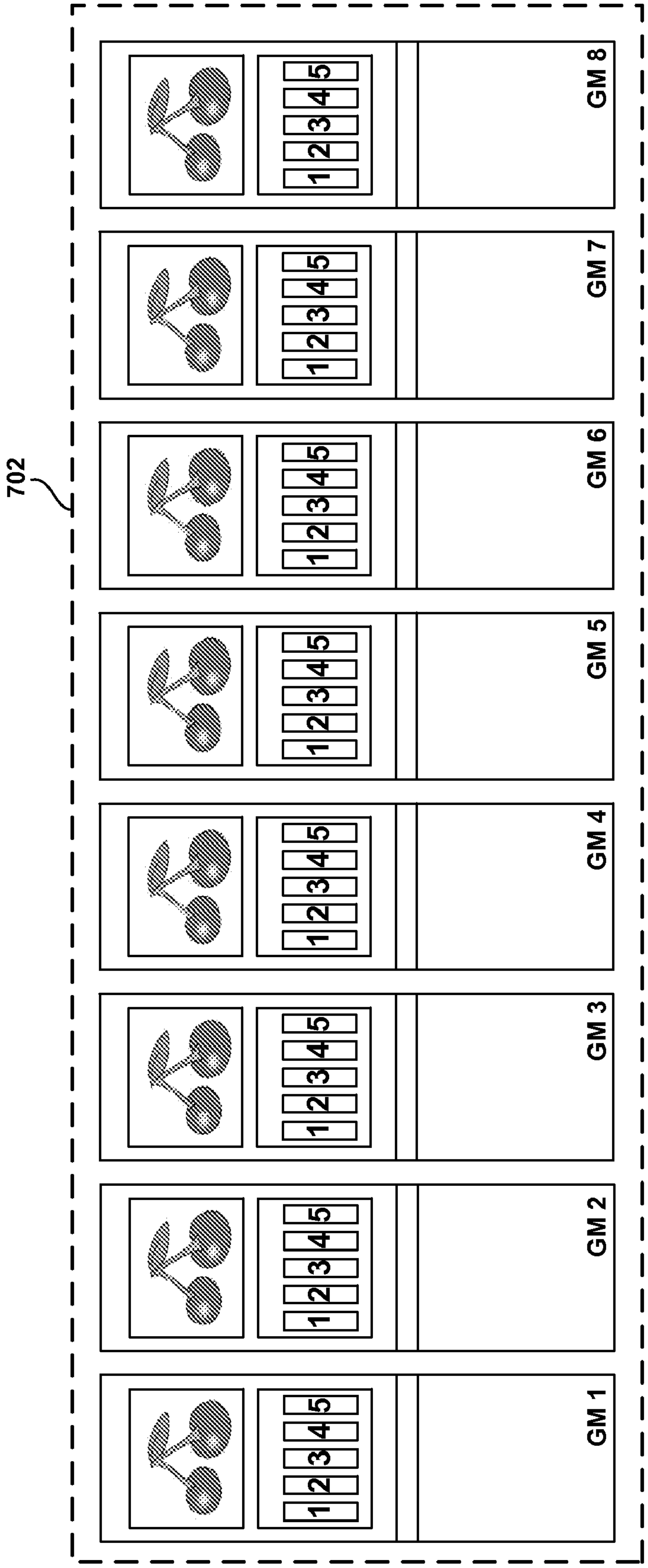
FIG. 7 depicts a bank of Hierarchical Five-Wheel games that is larger than five machines, according to an embodiment of the present invention.

In the present Hierarchical Five-Wheel Model according to embodiments of the present invention, game banks are not limited to five gaming machines: large, multi-terminal banks offering the excitement of significant jackpots are possible. FIG. 7 depicts a game bank 702 containing eight gaming machines and reinforces the concept that game banks are fully customizable. As game operators elect to configure banks containing more machines, larger jackpots become possible. Such configurations are likely to build excitement and draw players together in hopes of scoring a significant jackpot. Banks of fewer than five gaming machines are also possible.

Figure 8:
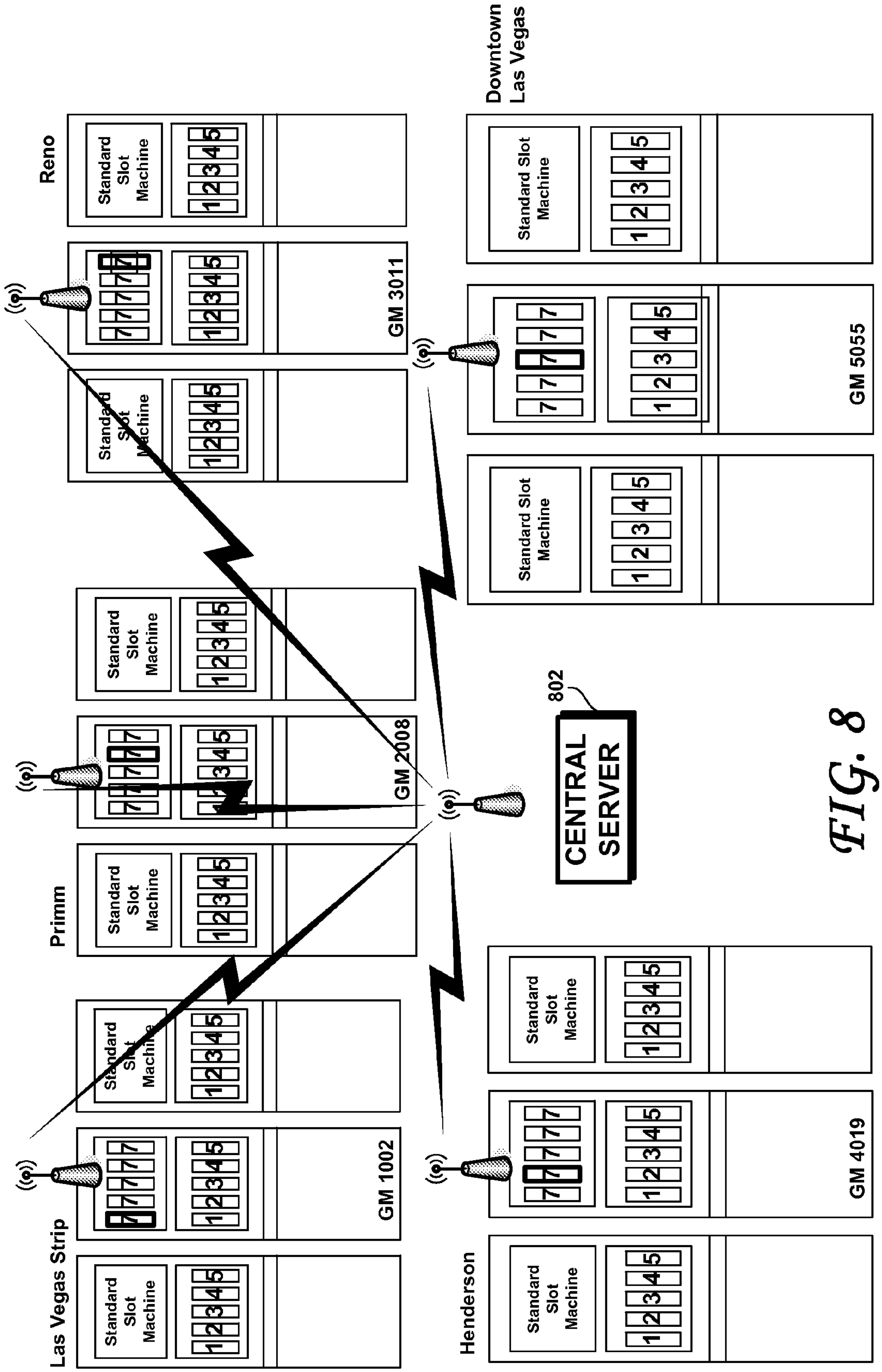
FIG. 8 illustrates "virtual game banks" according to further embodiments of the present invention

FIG. 8 illustrates another embodiment of the present invention, in which game operators may set up "virtual game banks" where geographically remote gaming machines (or gaming machines that are out of view from one another) are combined to create "virtual" secondary display paylines. In the example illustrated in FIG. 8, a designated gaming machine GM 1002 in the Las Vegas Strip contributes the first symbol of the secondary payline, a designated gaming machine GM 4019 in Henderson contributes the second symbol of the secondary payline, a designated gaming machine GM 5055 in downtown Las Vegas contributes the third symbol of the secondary payline, a designated gaming machine GM 2008 in Primm contributes the fourth symbol of the secondary payline and a designated gaming machine GM 3011 in Reno contributes the fifth symbol of the secondary payline, to complete the secondary payline. Since players may not be able to see the secondary display on other machines within their "virtual bank" a graphical representation of the entire secondary payline may be displayed on each player's gaming machine, as shown in FIG. 8. Virtual game banks (such as the virtual game bank that includes gaming machines GM 1002, GM 4019, GM 2008, GM 5505 and GM 3011 in FIG. 8) may be connected wirelessly, through standard phone lines, or via any method game operators choose to employ. Banks of gaming machines, therefore, need not be physically adjacent to one another. A central server 802 may administer the traffic handling functions to coordinate the operations of the disparate and geographically distributed gaming machines that form the constituent members of the virtual bank of gaming machines, among other possible functions.

Figure 9:
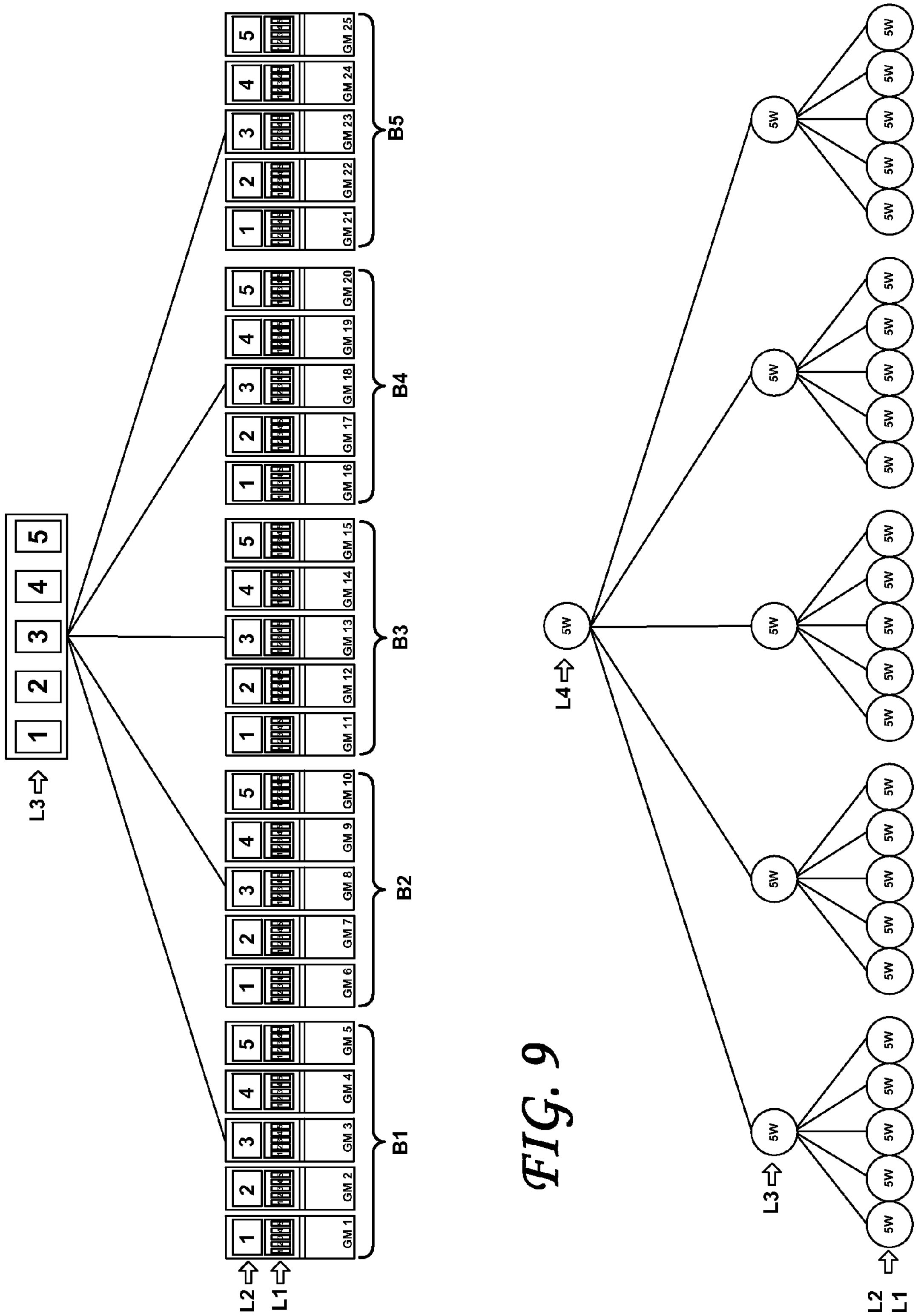
FIG. 9 depicts some multi-level game bank hierarchies, the first comprising of three levels of game play and the second comprising of four levels, according to another embodiment of the present invention.

FIG. 9 depicts two multi-tier Hierarchical Five-Wheel configurations, according to further embodiments of the present invention. The top-most drawing illustrates a bank comprising of three levels of game play including the primary game (L1) on primary displays 104 of each of the gaming machines, the secondary payline (L2) across gaming machines of a same bank and a tertiary payline (L3) that may be formed by one symbol from each of the five banks B1, B2, B3, B4 and B5. The lower drawing of FIG. 9 illustrates a Hierarchical Five-Wheel configuration having four levels, according to another embodiment of the present invention. Each of the "5W" units may represent a single gaming machine or a bank of gaming machines, with the middle level (L3) providing the symbols for the fourth level L4. In the present Hierarchical Five-Wheel model, game operators have the flexibility to construct multi-level hierarchies having as many levels as they desire. In this manner, hierarchical Five-Wheel game banks may be freely combined to create jackpot hierarchies with three, four, five or more levels. If the structure becomes too deeply layered, however, the complex multi-layer structure thereof may be lost on the player and may be ineffective in increasing player game play, player retention and gaming machine revenues.

Figure 10:
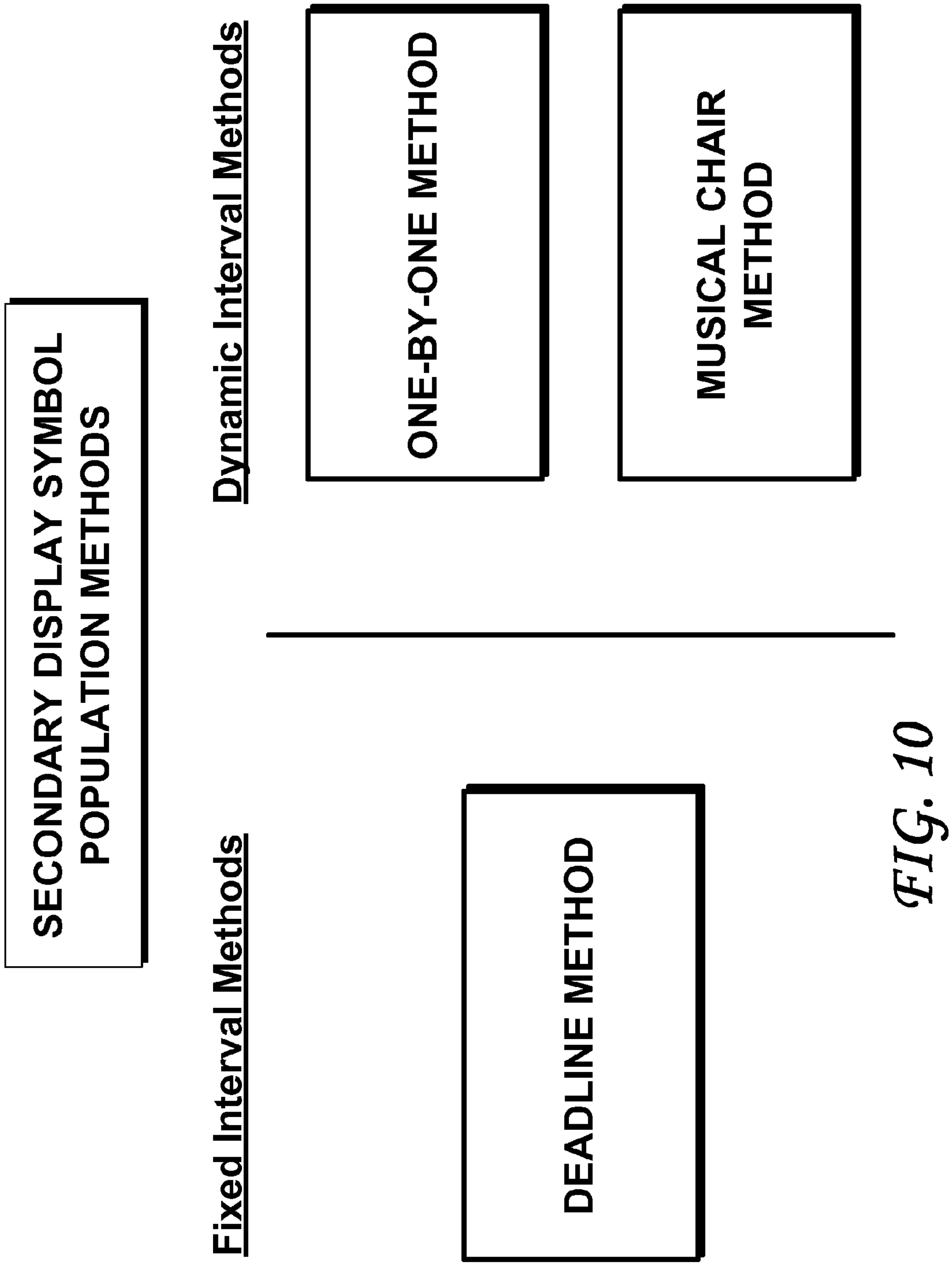
FIG. 10 illustrates methods by which secondary display symbols may be generated, according to still embodiments of the present invention.

FIG. 10 illustrates some possible methods by which secondary display symbols may be generated, according to still further embodiments of the present invention. Such methods may include (but are not limited to): 1) fixed interval methods and 2) dynamic interval methods. Fixed interval methods generate new symbols at a pre-set interval that is made known to players. One embodiment of such a fixed interval method is a "Deadline Secondary Payline Method," in which those players who input a bet before an established deadline participate in the symbol drawing for the secondary payline(s) at that interval and those players who enter a bet too late participate in the next interval. Dynamic interval methods group all players that bet within a variable window of time together to create a shared secondary payline. This window of time may be generated randomly or set intelligently by the network of gaming machines. In either case, the window is unknown to the player. In one variation of a dynamic interval method entitled a "One-by-One Secondary Payline Method," secondary display symbols within the (shared) secondary payline are revealed one-by-one, as each player bets. In a second variation, entitled a "Musical Chair Secondary Payline Method," secondary display symbols may appear to continuously blink or spin at the time of each wager, only to be revealed when the window expires and the final grouping of participating machines is established. These fixed interval or dynamic interval methods need not only apply to secondary display symbol population (or third, fourth, fifth, etc. . . . level), but may also be leveraged to create an additional display population model able to handle multi-tier networks comprising of however many gaming displays that a game operator desires to establish.

Figure 11:
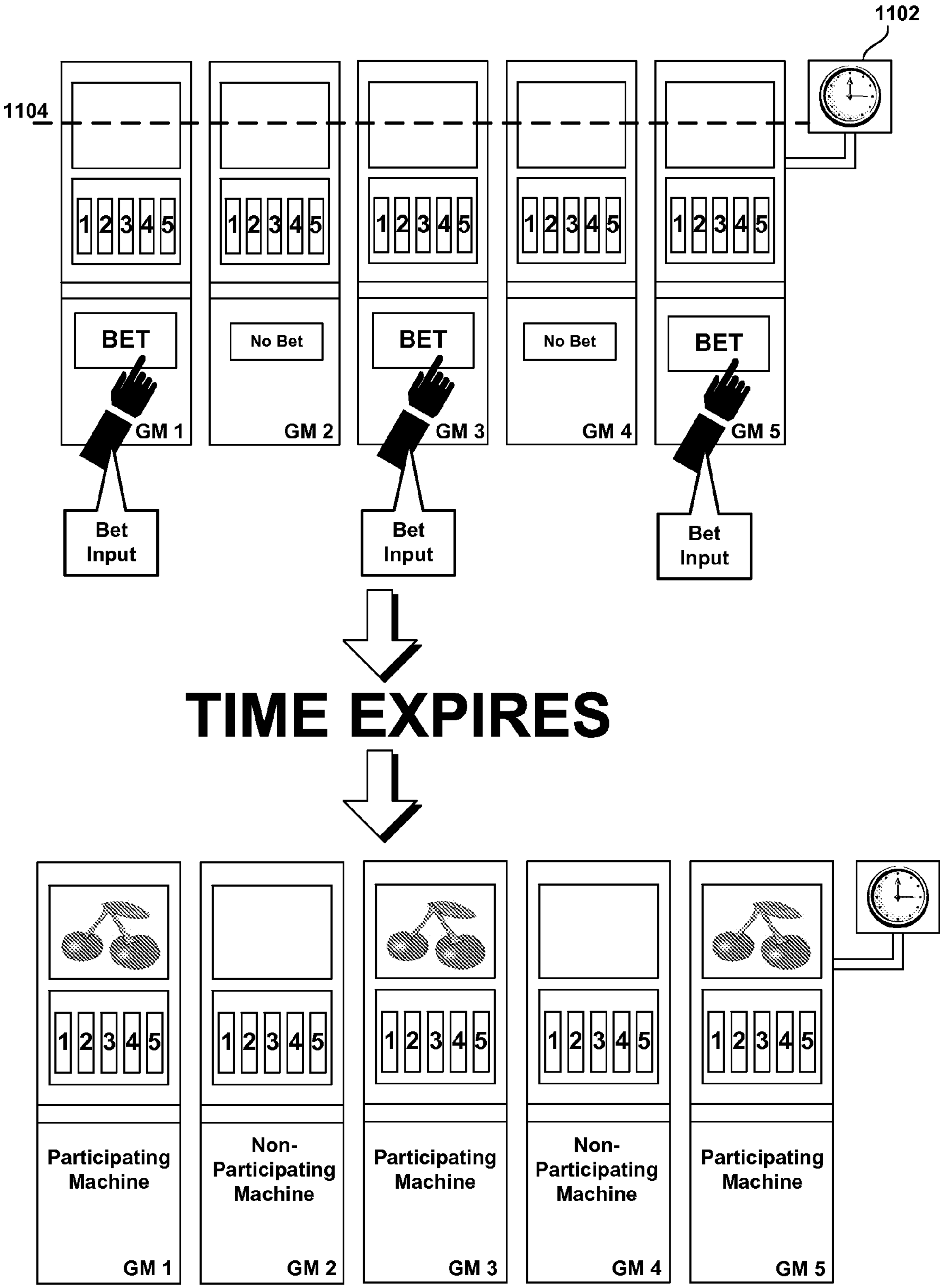
FIG. 11 depicts a model of the Deadline Secondary Payline Method, according to an embodiment of the present invention.

FIG. 11 depicts a model of the Deadline Secondary Payline Method, according to an embodiment of the present invention. In the Deadline Secondary Payline Method, a visible timer 1102 may display a predetermined interval by which players of the gaming machines GM1, GM2, GM3, GM4 and GM5 must input a bet if they want to participate in the next drawing for the secondary payline 1104. If a player bets before that interval expires, his or her gaming machine participates in the drawing. If the player does not bet, his or her gaming machine does not participate. If the player bets too late, his or her gaming machine participates in the next drawing. In FIG. 11, the players of gaming machines GM1, GM3 and GM5 have indeed input their bets into their respective gaming machines before the expiration of the predetermined interval, as indicated by the visible timer 1102. Therefore, the players of the gaming machines GM1, GM3 and GM5 will participate in any payoff of the secondary payline 1104, as shown in the lower drawing of FIG. 11. Symbol assignment may be generated within a central server (or in a serverless fashion in a peer-to-peer topology) once all participating gaming machines are established. The symbols to appear on the secondary payline 1104 of participating gaming machines (in this case, GM1, GM3 and GM5) may then be displayed on each participating gaming machine's secondary display. Jackpots may be shared by all participating players equally or may be weighed more heavily toward or entirely awarded to players meeting certain predetermined criteria. In one embodiment of a Deadline Secondary Payline Method, players may input more than one bet before their deadline expires. In said embodiment, players who have bet more (with respect to both bet size and bet frequency) may receive a larger percentage of an awarded jackpot than players who have bet less.

Figure 12:
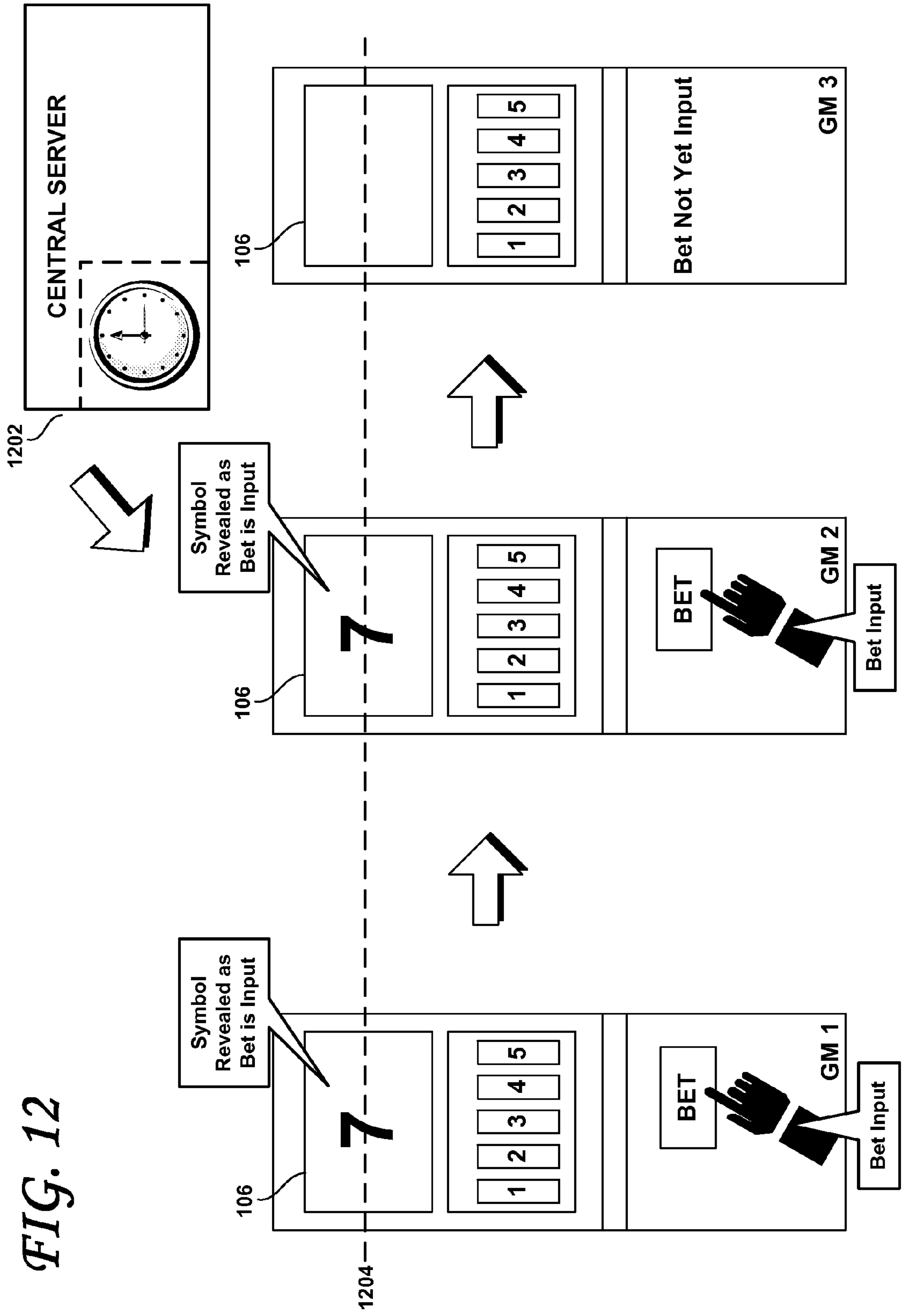
FIG. 12 depicts a model of the One-by-One Secondary Payline Method, according to an embodiment of the present invention.

FIG. 12 depicts a model of the One-by-One Secondary Payline Method, according to further embodiments of the present invention. In the One-by-One Secondary Payline Method, players are not made aware of the cutoff time (which may be determined by central server 1202) by which they must bet to participate in building the secondary payline 1204, so they may be encouraged to bet quickly to increase their chance of participating in any winnings from the secondary payline 1204. When a player bets, his or her secondary display 106 may be immediately populated with a symbol. Other players may then decide whether or not to play based on the symbols that are already displayed on neighboring machines' secondary displays. A partially populated secondary payline that appears to have a good chance of becoming a winning secondary payline may, in this manner, attract other players to any free gaming machines within the bank, in the hopes of sharing in any eventual payoff of the secondary payline. Symbol assignment may occur at the central server 1202 (or in a serverless fashion in a peer-to-peer topology) and may be calculated for an entire secondary payline 1204 in advance such that attractive symbols are revealed first to stimulate play. Outcomes may be determined one at a time, symbol by symbol or entire paylines may be assigned upon the advent of the first wager on a participating machine. Jackpots may be shared by all participating players equally or may be weighed more heavily toward or entirely awarded to players meeting certain predetermined criteria.

Figure 13:
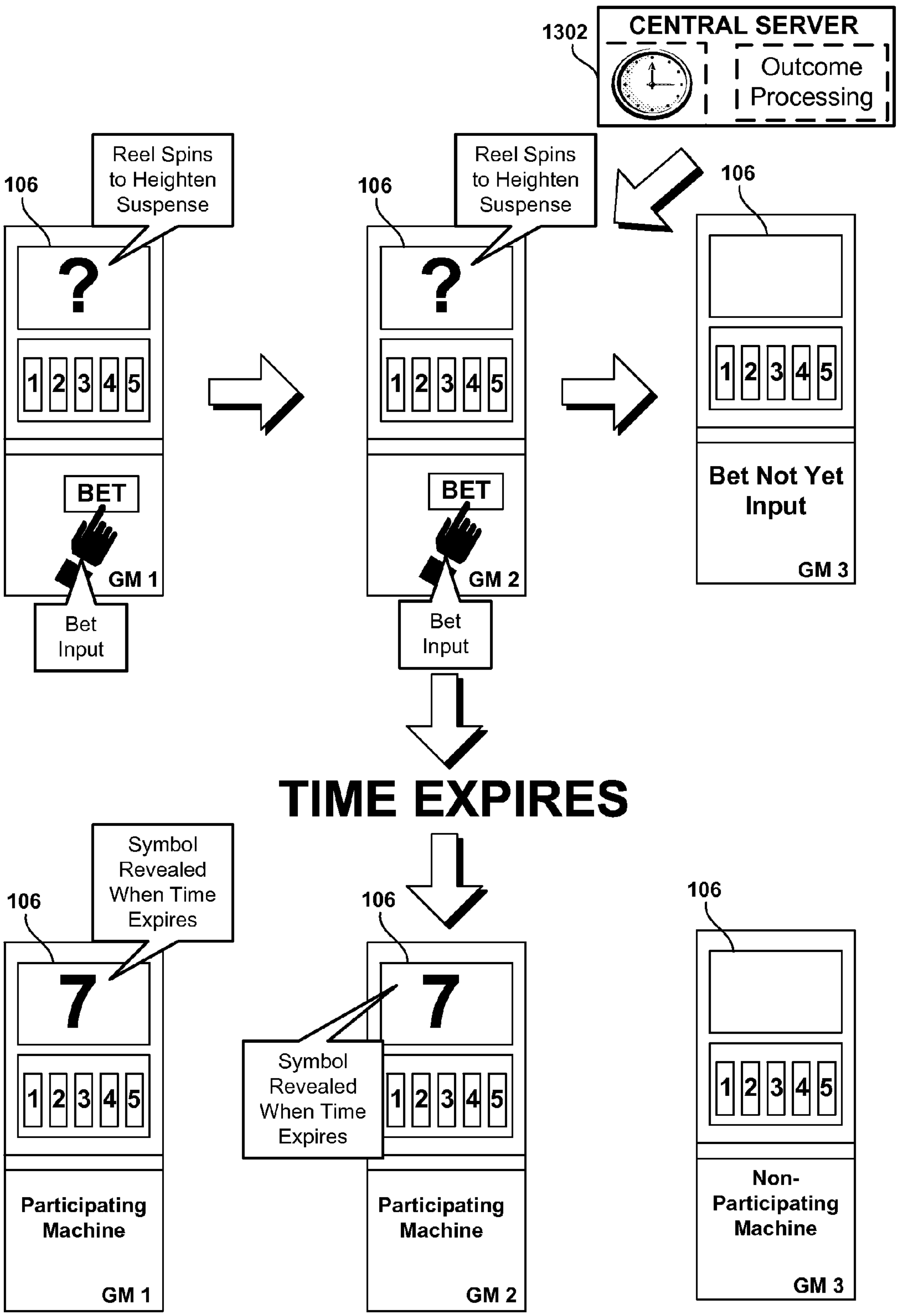
FIG. 13 depicts a model of the Musical Chair Secondary Payline Method, according to an embodiment of the present invention.

FIG. 13 depicts a model of the Musical Chair Secondary Payline Method, according to another embodiment of the present invention. In the Musical Chair Secondary Payline Method, players are not made aware of the cutoff time (which may be determined by central server 1302) by which they must bet to participate in building a secondary payline (so they may want to bet quickly to increase their chance of participation). When a player bets, the reel on his or her secondary display 106 may begin to spin or blink or behave in some manner that indicates that it is in play but that does not reveal the symbol on which each reel will stop. Other players may decide whether or not to play based on the number of spinning reels on the secondary displays 106 that exist on neighboring gaming machines' secondary displays 106, as drawings with more symbols have the potential of generating larger rewards. Symbol assignment may occur at the central server 1302 (or in a serverless fashion in a peer-to-peer topology) and may be calculated for an entire payline in advance such that, once a predetermined number of gaming machines have participated, all of their secondary display symbols are revealed. Jackpots may be shared by all participating players equally or may be weighed more heavily toward or entirely awarded to players meeting certain predetermined criteria.

Figure 14:
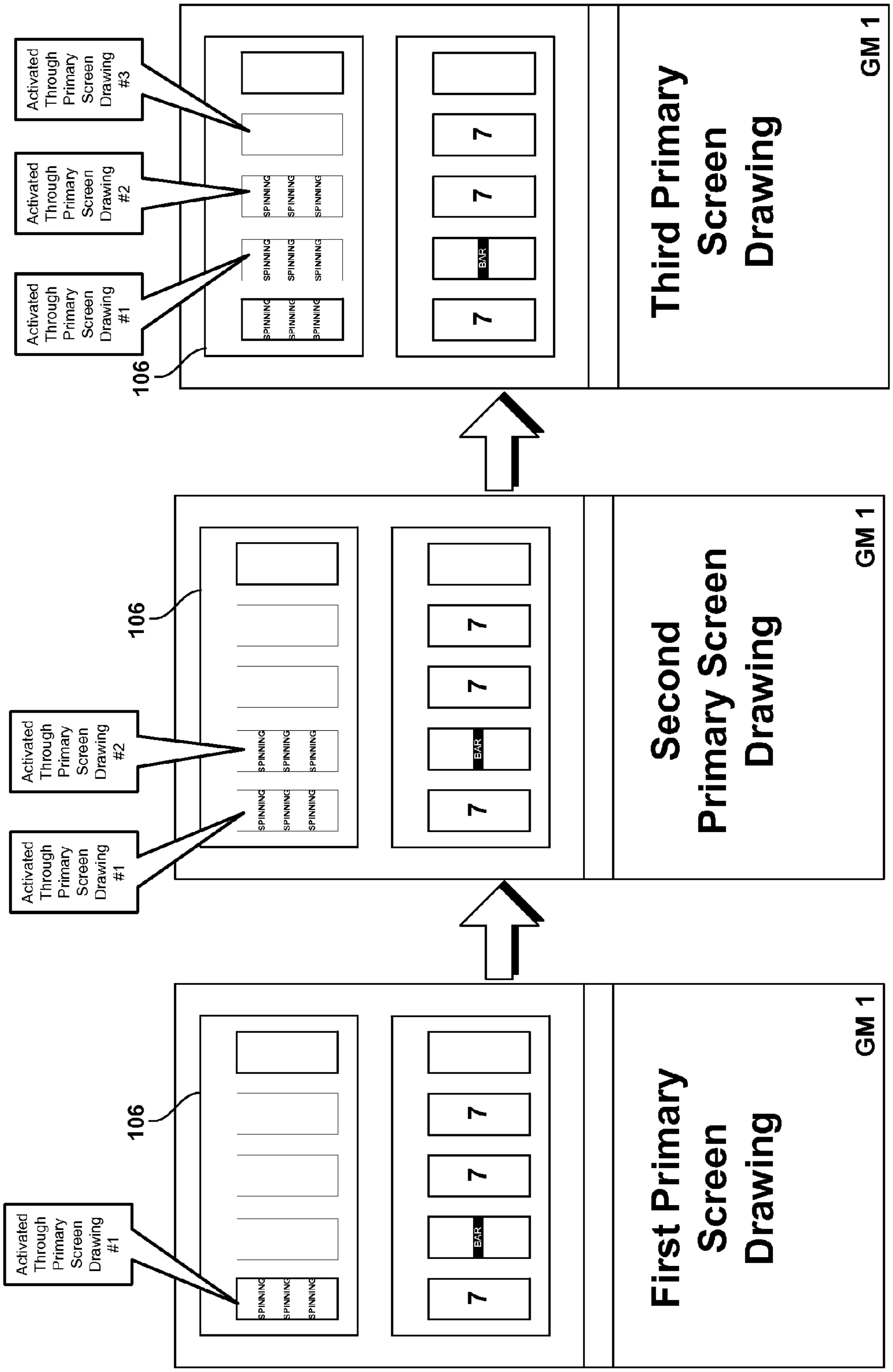
FIG. 14 illustrates how a player may populate multiple secondary display symbols on his or her own machine in a Musical Chair Model, according to yet another embodiment of the present invention.

FIG. 14 shows a gaming machine GM1 on which the player has populated multiple symbols. According to an embodiment of the present invention, when there are too few players to construct a multi-player secondary payline in a timely fashion, a player may contribute two or more symbols to their own second-display drawing, with a new reel on the secondary display 106 beginning to spin each time the player plays his or her primary game. In this manner, a player of a single gaming machine may still enjoy the heightened excitement of a secondary payline on the secondary display of his gaming machine, even if there are no other players on neighboring gaming machines. According to this embodiment, each time the player plays his or her primary game, a reel on the secondary display 106 may spin (i.e., the image of the reel may appear to spin on the secondary display) and reveal a symbol, to progressively populate a secondary payline on the secondary display 106 of his or her gaming machine, as opposed to the previously disclosed embodiments, in which the secondary payline was composed of the respective symbols displayed on the secondary displays of other gaming machines. For example, after the fifth time the player inputs a bet on his or her gaming machine, the last symbol may be revealed on the secondary display 106 of his or her gaming machine (in the example of FIG. 14, GM1).

Figure 15:
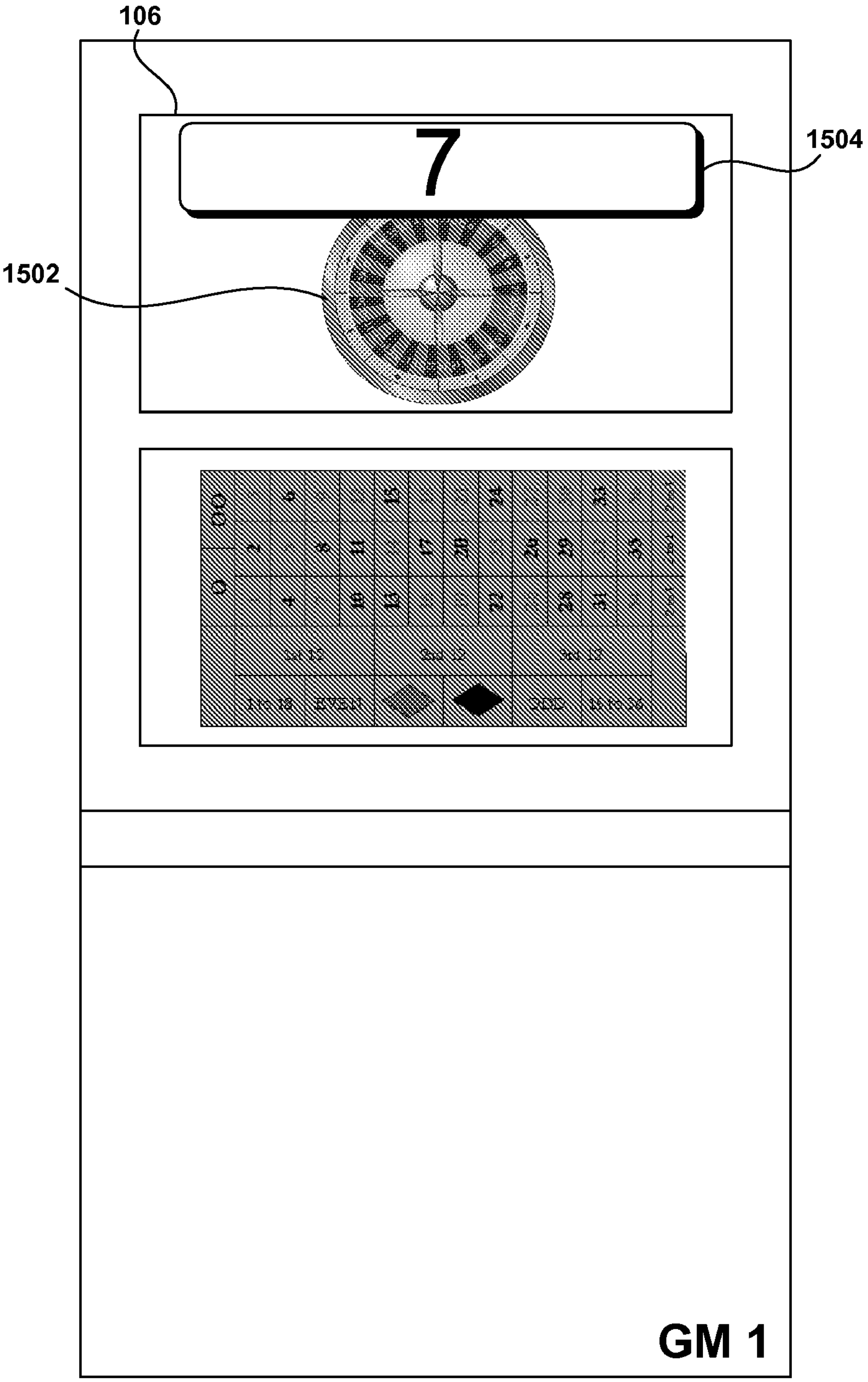
FIG. 15 illustrates how pop-up technology may allow for maximal use of each machine's secondary display in the Hierarchical Five-Wheel model, according to a further embodiment of the present invention.

FIG. 15 depicts a secondary display 106 on a Hierarchical Five-Wheel gaming machine, according to another embodiment of the present invention. According to this embodiment, the secondary display 106 may be used for an entirely different purpose than to display one or more symbols of a secondary payline. In FIG. 15, the secondary display 106 is currently being used to display a roulette wheel 1502. According to this embodiment, the symbol or symbols that are to populate the secondary payline to appear on the secondary display or displays 106 may utilize pop-up window technology. Therefore, the symbols to populate the secondary payline may "pop-up" on an as-needed basis, such that the secondary display 106 may be used simultaneously for other purposes.

While the foregoing detailed description has described several embodiments of this invention, it is to be understood that the above description is illustrative only and not limiting of the disclosed invention. A number of other modifications will no doubt occur to persons of skill in this art. For example, in an alternate embodiment of Hierarchical Five-Wheel Gaming according to the present invention, one player may win the right to control the assignment of multiple top display symbols. In such an embodiment, the player's wager may generate symbols on all of the top displays within that player's gaming bank and may lead to an award granted solely to that player or shared by players on all included machines. All such modifications, however, should be deemed to fall within the scope of the present invention.

What is claimed is:

1. A method of awarding jackpots in a networked gaming system that includes a plurality of gaming machines, the method comprising the steps of:

funding a first and a second jackpot;

establishing a network of five groups of five gaming machines of the plurality of gaming machines, each of the gaming machines having a first video display and a second video display;

providing a separate five-reel primary game of chance on each of the five gaming machines, each separate five-reel primary game of chance being displayed on the first video display of one of the five gaming machines across a primary payline;

providing a five-reel secondary game of chance that provides, across a secondary payline, an outcome symbol combination that is independent of an outcome symbol combination of each of the separate five-reel primary games of chance on each of the five gaming machines, each one of the five reels of the secondary game having symbols displayed on the second video display of a selected one of the five gaming machines;

rewarding at least one participating player of the five gaming machines all or part of the first jackpot when predetermined, reward-generating symbol combinations occur on a secondary payline collectively formed across the reels displayed on the five second video displays subsequent to an outcome of the secondary game of chance;

providing a five-reel tertiary game of chance that is configured to generate a tertiary payline that is collectively formed by one symbol from the secondary payline of each group of five gaming machines;

awarding at least one participating player of all or part of the second jackpot when predetermined, reward-generating symbol combinations occur on the tertiary payline subsequent to an outcome of the tertiary game of chance.

2. The method of claim 1, further comprising the step of providing a central server and wherein the secondary game of chance is controlled by the central server.

3. The method of claim 1, wherein the secondary game of chance is controlled by at least some of the five gaming machines in a peer-to-peer fashion.

4. The method of claim 1, wherein the first video display and the second video display of each of the five gaming machines are merged into a single display.

5. The method of claim 1 wherein, in at least one of the five gaming machines, the second video display is a portion of the first video display.

6. The method of claim 1, further comprising a step of increasing the first jackpot by collecting a selected amount from wagers used to fund the primary game played by players of the five gaming machines and by adding the collected selected amount to the first jackpot.

7. The method of claim 1, further comprising the step of revealing symbols of the secondary payline displayed across the second video displays of the five gaming machines at a predetermined posted interval and wherein only participating players who have placed a wager before an expiration of a current interval share in the rewarded first jackpot.

8. The method of claim 7, further comprising the step of keeping participating players who do not place a wager before the expiration of the current interval from sharing in any of the first and second jackpots to be awarded at a next interval.

9. The method of claim 7, wherein the establishing step is carried out such that the five gaming machines in the network are freely selectable from among the plurality of gaming machines from one interval to the next interval.

10. The method of claim 1, wherein each symbol of the secondary payline is revealed concurrently with each wager placed on the primary game.

11. The method of claim 10, wherein symbols of the secondary payline are revealed on each of the five gaming machines only when a primary game wager has been placed on each of the five gaming machines.

12. The method of claim 11, wherein each reel of the five-reel secondary game of chance spins to heighten player suspense between placing a wager on the primary game and when the reels of the five-reel secondary game of chance stop to form the stopped secondary payline that spans across each of the second video displays of the five gaming machines.

13. The method of claim 1, further comprising the step of updating the tertiary payline subsequent to an outcome of the secondary game on each of the five groups of five gaming machines.

14. The method of claim 1, further comprising the step of providing a central server coupled to the network and wherein the tertiary game of chance is controlled by the central server.

15. The method of claim 1, wherein the tertiary game of chance is controlled by participating ones of the five groups of five gaming machines in a peer-to-peer fashion.

16. The method of claim 1, further comprising the step of displaying the outcome symbol combination of the secondary payline displayed across the second video displays of the five gaming machines in a portion of one of the first video display and the second video display in each of the five gaming machines.

17. The method of claim 1, further comprising the step of displaying at least the tertiary payline displayed on the third video display in a portion of one of the first video display and the second video display in each of the five gaming machines.

18. The method of claim 1, wherein each of the five gaming machines are configured to utilize pop-up window technology for the secondary gaming displays such that the secondary gaming displays are usable for multiple purposes.

19. The method of claim 18, wherein the multiple purposes include at least one of replicating the outcome symbol combination of the secondary payline displayed across the second video displays of the five gaming machines, and replicating at least the tertiary payline displayed on the third video display.

20. A method of awarding a jackpot in an electronic game of chance, comprising the steps of:

establishing a network of at least two participating gaming machines, each participating gaming machine having at least a primary display area and a secondary display area;

providing a primary game of chance on the primary display area of each participating gaming machine, the outcome of the primary game being random;

collecting a wager from one or more players on all participating gaming machines, the wager being used to fund a jackpot of the primary game and at least one secondary game;

displaying symbols on the secondary display area of each participating gaming machine in the network responsive to said wager;

enabling a participating player to activate more than one symbol on the secondary display area of his or her participating gaming machine by placing multiple primary game wagers before an outcome of a current on-going secondary game is fixed;

rewarding at least a portion of a jackpot of the at least one secondary game to at least one participating player when predetermined, reward-generating symbol combinations are provided on a payline that spans across the secondary display areas of participating gaming machines, the predetermined, reward-generating symbol combinations displayed on the secondary displays being independent of reward-generating symbol combinations of the primary game of chance on any of the participating gaming machines.

21. The method of claim 20, further comprising the step of revealing first display area symbols at a predetermined posted interval and wherein only those players who have placed a wager before an expiration of the interval are eligible to share in the jackpot.

22. The method of claim 21, further comprising the step of keeping participating players who do not place a wager before expiration of a current interval from sharing in any jackpot to be awarded at a next interval.

23. The method of claim 20, wherein both a number of the participating gaming machines and which of the symbols displayed on each of the secondary display area collectively make up the payline are determined by a central server coupled to the network.

24. The method of claim 20, further comprising a step of displaying symbols on the secondary display area concurrently with each wager placed on the primary game.

25. The method of claim 24, further comprising a step of revealing symbols of the secondary payline on each of the participating gaming machines only when a primary game wager has been placed on each of the participating gaming machines.

26. The method of claim 25, further comprising a step of spinning the symbols on the secondary display area to heighten player suspense.

27. A gaming method, comprising:

providing a gaming machine having a first and a second display;

providing a primary five-reel game of chance on the first display;

providing a secondary five-reel game of chance on the second display, the secondary game of chance being configured to provide at least one outcome symbol combination across at least one payline thereof that is independent of an outcome symbol combination of the primary game;

enabling a player to play and place a wager on the primary game and rewarding the player if at least one outcome symbol combination of the primary game is a reward-generating symbol combination, and progressively populating each reel of the secondary game of chance by spinning one reel thereof for each play of the primary game such that at least one five symbol combination appears on the secondary display across at least one payline thereof after five plays of the primary game and rewarding the player if at least one activated payline of the secondary game of chance shows a symbol combination that is a reward-generating symbol combination.

28. The gaming method of claim 27, further comprising the step of causing a selected reel of the second five-reel game of change to spin each time the first five-reel primary game of chance is played.

29. A gaming machine, comprising:

a first display;

a second display;

a primary five-reel game of chance displayed on the first display;

a secondary five-reel game of chance displayed on the second display, the secondary game of chance being configured to provide at least one outcome symbol combination across at least one payline thereof that is independent of an outcome symbol combination of the primary game, wherein the gaming machine is further configured to enable a player to play and place a wager on the primary game and to reward the player if at least one outcome symbol combination of the primary game is a reward-generating symbol combination, and to progressively populate each reel of the secondary game of chance by spinning one reel thereof for each play of the primary game such that at least one five symbol combination appears on the secondary display after five plays of the primary game and to reward the player if at least one activated payline of the secondary game of chance shows a symbol combination that is a reward-generating symbol combination.

30. The gaming method of claim 29, further comprising the step of causing a selected reel of the second five-reel game of change to spin each time the first five-reel primary game of chance is played.

31. A gaming method, comprising:

providing a plurality of gaming machines, each gaming machine including a first and a second display;

establishing a network of N groups of M gaming machines of the plurality of gaming machines;

providing a separate primary game of chance on each of the M gaming machines, each separate primary game being displayed on the first video display of one of the M gaming machines;

providing a secondary game of chance that provides an outcome symbol combination that is independent of an outcome symbol combination of each of the separate primary games on each of the M gaming machines of each of the N groups, the secondary game of each of the N groups having symbols displayed on the second video displays of the M gaming machines of their respective one of the N groups;

rewarding at least one participating player of the M gaming machines when a reward-generating symbol combination occurs on a secondary payline collectively formed across the M second video displays within one of the N groups subsequent to an outcome of the secondary game;

providing a tertiary video display coupled to each of the N groups of M gaming machines;

providing a tertiary game of chance that is configured to generate a tertiary outcome symbol combination across at least one tertiary payline, the tertiary outcome symbol combination being collectively formed by one symbol from each of the secondary paylines of each of the N groups of M gaming machines;

displaying the tertiary outcome symbol combination on the tertiary video display, and rewarding at least one participating player of the N groups of M gaming machines when the displayed tertiary outcome symbol combination is a reward-generating symbol combination.

32. The gaming method of claim 31, wherein both N and M are equal to 5.

33. The gaming method of claim 31, wherein at least one of the primary, secondary and tertiary games of chance is a 5-reel game of chance.

* * * * *